United States Patent
Fujii (10) Patent No.: US 8,384,364 B2
(45) Date of Patent: Feb. 26, 2013

(54) UNIT INVERTER SYSTEM

(75) Inventor: Kansuke Fujii, Machida (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 330 days.

(21) Appl. No.: 12/904,317

(22) Filed: Oct. 14, 2010

(65) Prior Publication Data

US 2011/0090720 A1    Apr. 21, 2011

(30) Foreign Application Priority Data

Oct. 15, 2009    (JP) ................................. 2009-238294

(51) Int. Cl.
*G05F 1/59*    (2006.01)
(52) U.S. Cl. .................... 323/272; 323/285; 363/65
(58) Field of Classification Search .................. 323/222, 323/224, 225, 246, 272, 282–290; 363/16, 363/17, 34, 37, 39, 41, 59, 60, 65, 69, 71, 363/72, 95, 131, 132; 318/801, 807
See application file for complete search history.

(56) References Cited

U.S. PATENT DOCUMENTS

| | | | | |
|---|---|---|---|---|
| 4,597,037 | A * | 6/1986 | Okado | 363/41 |
| 5,450,309 | A * | 9/1995 | Rohner | 363/71 |
| 6,198,261 | B1 * | 3/2001 | Schultz et al. | 323/272 |
| 7,046,527 | B2 * | 5/2006 | West | 363/41 |
| 7,477,045 | B2 * | 1/2009 | Schuellein et al. | 323/272 |

FOREIGN PATENT DOCUMENTS

| | | |
|---|---|---|
| JP | 06-165513 A | 6/1994 |
| JP | 07-067346 A | 3/1995 |
| JP | 09-131067 A | 5/1997 |
| JP | 2006-296110 A | 10/2006 |

* cited by examiner

*Primary Examiner* — Rajnikant Patel
(74) *Attorney, Agent, or Firm* — Rabin & Berdo, P.C.

(57) ABSTRACT

In a unit inverter system where multiple unit inverters are connected in parallel, the quantity of operating unit inverters is determined in accordance with an amount of power to be converted. A gate signal of a semiconductor switching element of a unit inverter is turned off after an output current of the inverter is reduced when reducing the quantity of inverter units, thereby improving the partial load efficiency of the system without an adverse effect on the system. A regulator connected to the inverter determines dead time of the inverter according to the output current value and an average output current value of the unit inverters, waits for the determined dead time so as to reduce the output current of the unit inverter, and then turns off the gate signal.

18 Claims, 9 Drawing Sheets

UNIT INVERTER SYSTEM

CROSS-REFERENCE TO RELATED APPLICATION

This application claims priority under 35 U.S.C. §119 from Japanese Patent Application 2009-238294, filed Oct. 15, 2009, the entirety of which is incorporated herein by reference.

BACKGROUND OF THE INVENTION

1. Technical Field

The present invention relates to a technology of controlling a unit inverter system where a dispersed power source whose power fluctuates, such as in solar battery or wind power generation, includes multiple unit inverters, and a quantity of operating unit inverters is changed in accordance with power generated. The present invention also relates to a dead time regulator that adjusts dead time of a unit inverter to reduce an output current of the unit inverter before stopping the unit inverter to reduce the quantity of operating unit inverters.

2. Related Art

Figure 6:
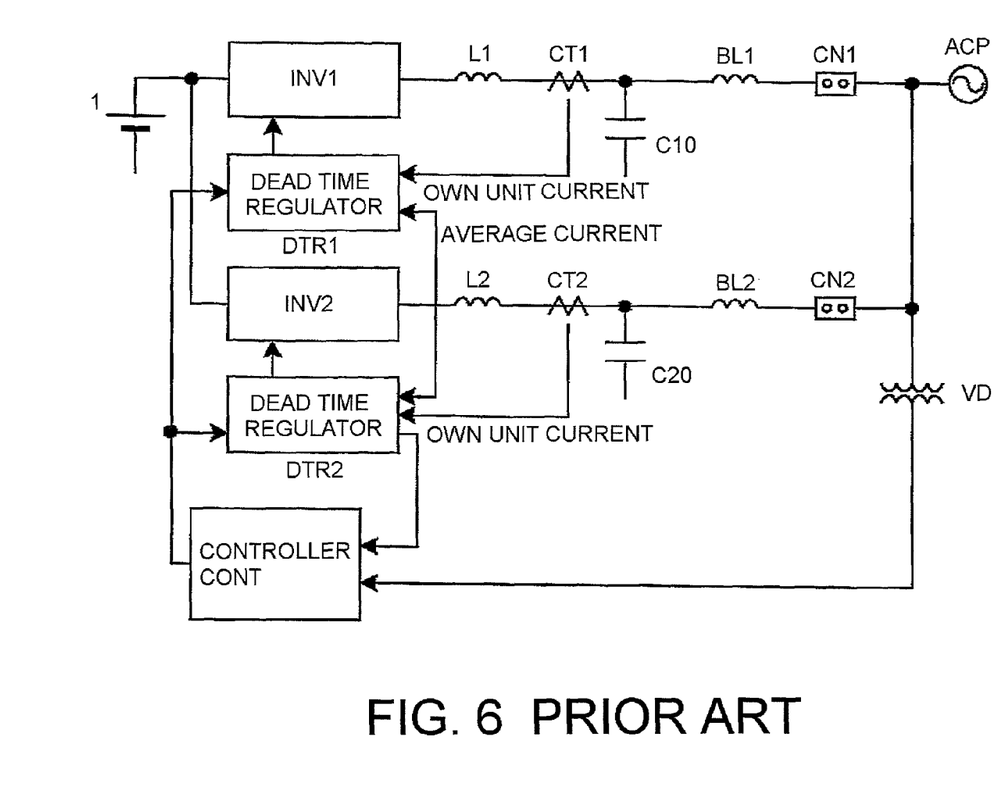
FIG. 6 shows a heretofore known unit inverter system configuration diagram.

The configuration of a unit inverter system using heretofore known technology, where multiple inverter units are connected in parallel, and the capacity of the system is increased, is shown in FIG. 6. The system includes a direct current power source 1 such as a solar battery as an input, an inverter INV1, whose output is connected to an alternating current filter formed of an alternating current reactor L1 and a capacitor C10, a balance reactor BL1 and a contactor CN1. The system also includes an inverter INV2, whose output is connected to an alternating current filter formed of an alternating current reactor L2 and a capacitor C20, a balance reactor BL2, and a contactor CN2. The inverters INV1 and INV2 are connected in parallel, and connected to an alternating current power source ACP of the system. The inverters INV1 and INV2 respectively include current detectors CT1 and CT2, which detect an output current, and dead time regulators DTR1 and DTR2. The output current of each inverter is controlled by a command from a common controller CONT.

When connecting this kind of unit inverter to a system, it is connected to the system after reducing a high frequency current output by the inverters using the inverters, the alternating current reactors, and the capacitors. Furthermore, when providing a contactor in each unit, the balance reactors BL1 and BL2 are used to balance the current of the contactors, in order to reduce the cost of the contactors.

Figure 8:
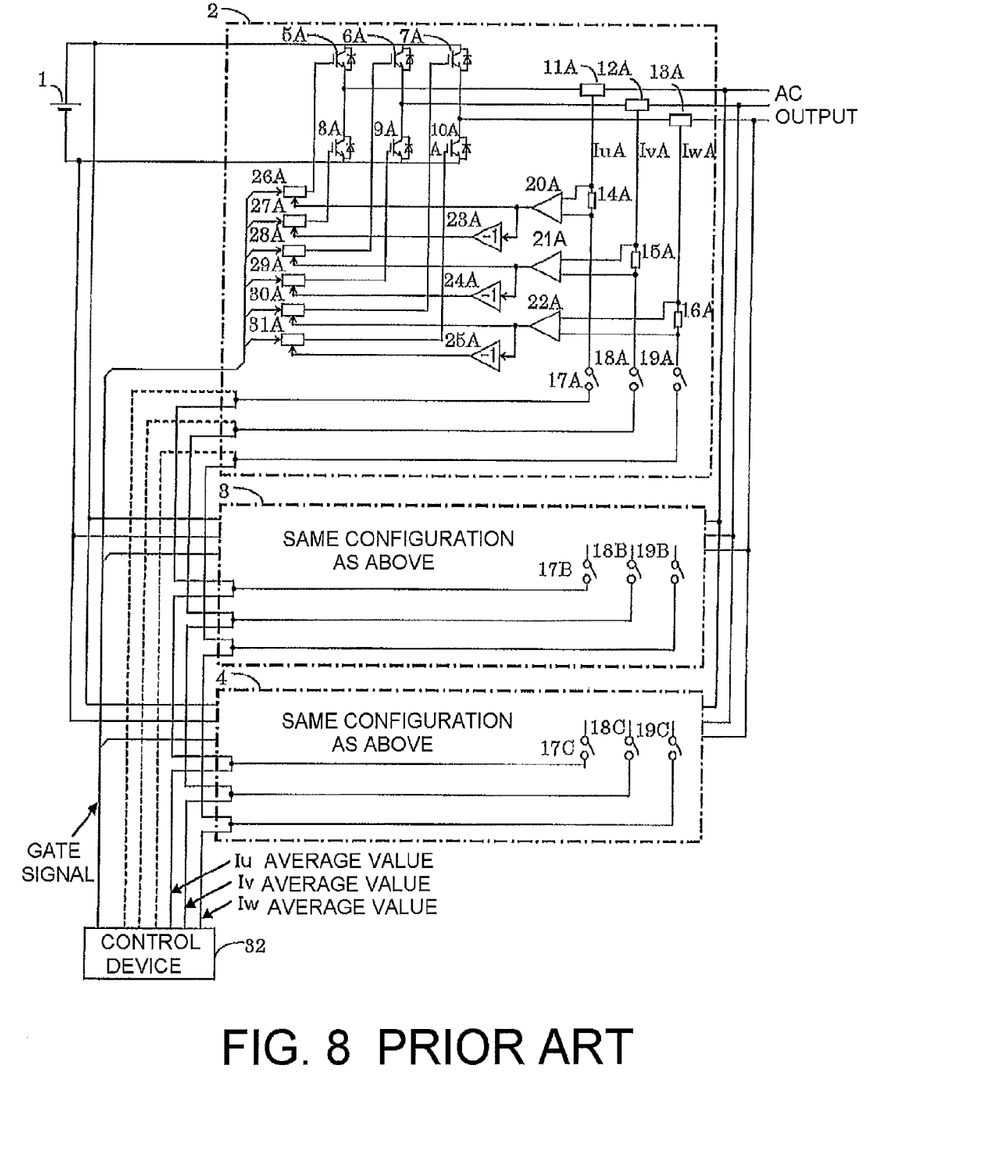
FIG. 8 is a current control system diagram of a heretofore known unit inverter system.
Figure 9:
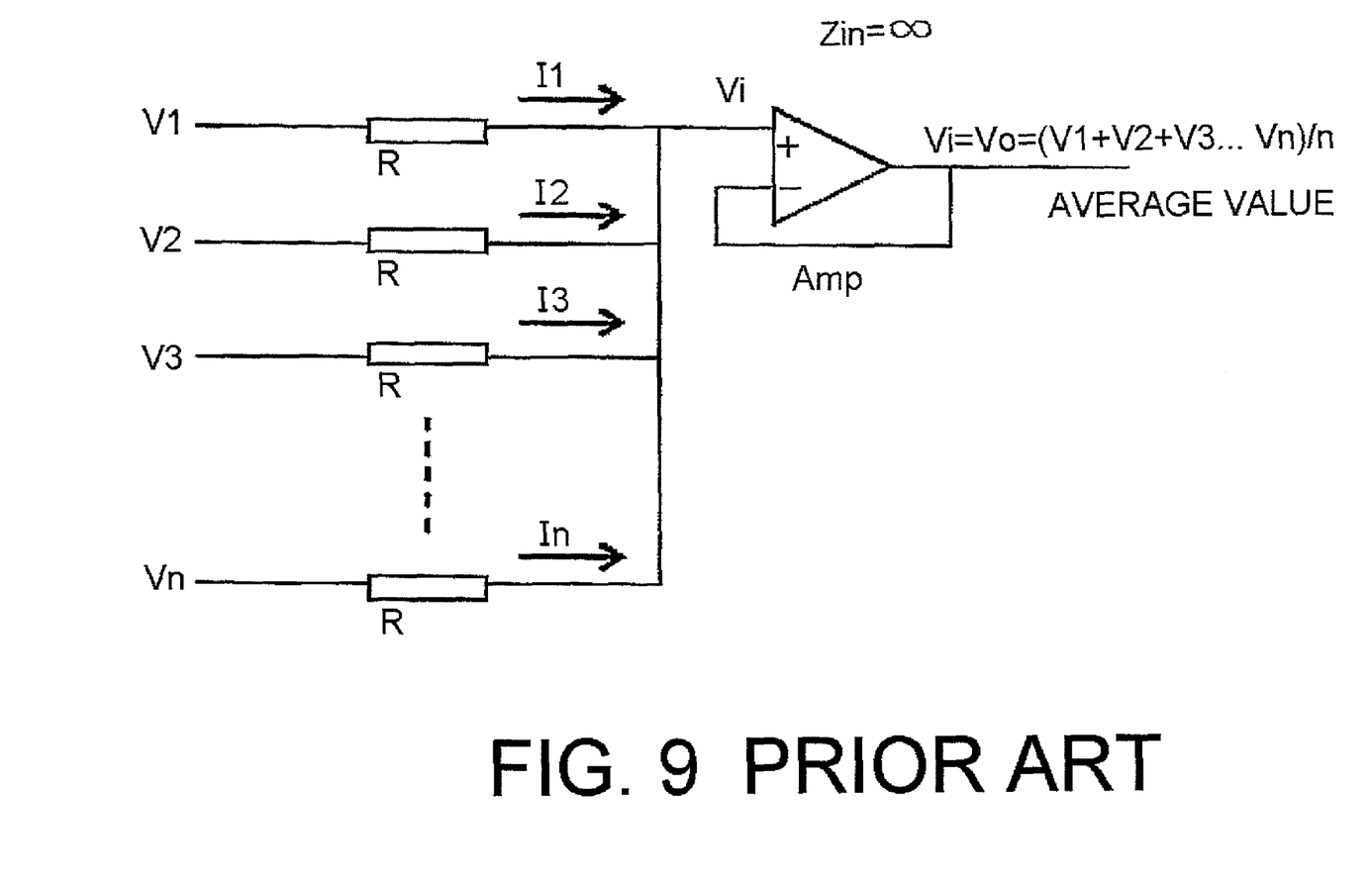
FIG. 9 is a principle diagram of an average current calculation.

This kind of unit inverter calculates an average current of each unit using the circuit configuration shown in FIG. 8 and principle shown in FIG. 9 described in JP-A-2006-296110, and carries out a control using a voltage at a connection point with the current. Referring to FIG. 6, a PWM pulse signal output by the controller CONT is supplied to the inverters as a gate signal via the dead time regulators DTR1 and DTR2 in each unit. The average current can be obtained using the kind of calculator circuit shown in FIG. 9 by converting the output of each current detector into a voltage, as described in JP-A-2006-296110.

Figure 7:
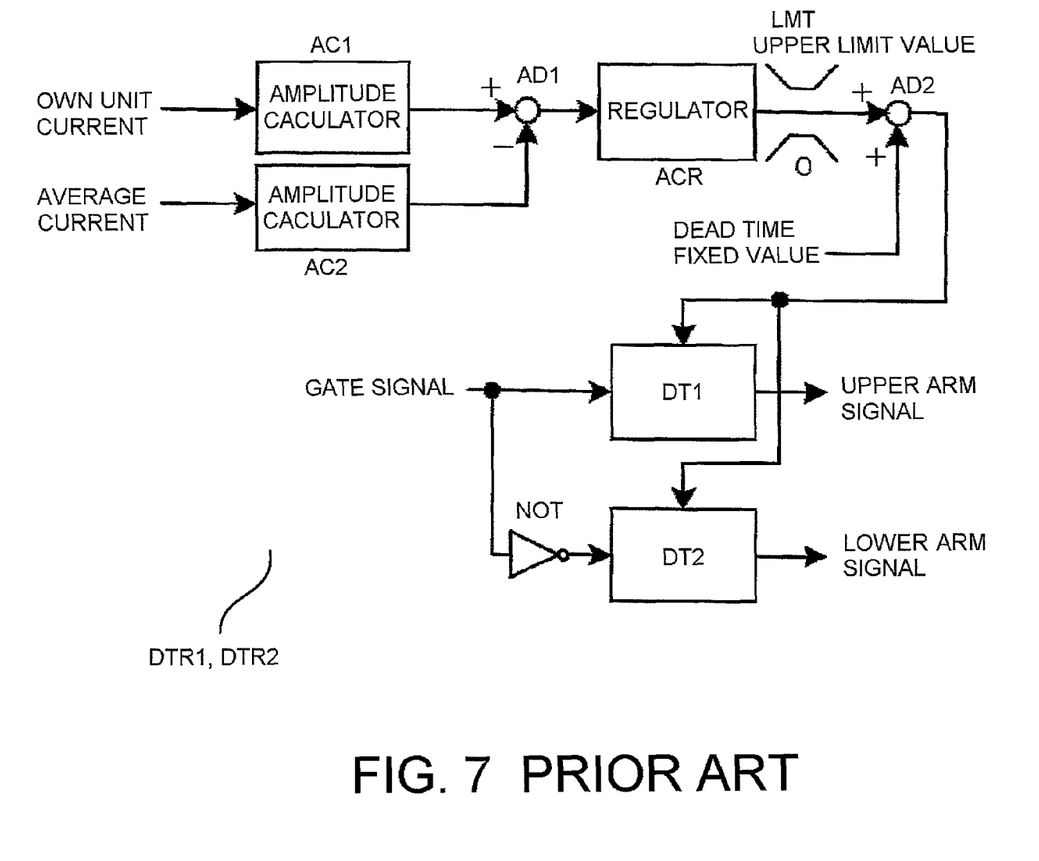
FIG. 7 shows a heretofore known dead time control circuit block diagram.

The configuration of the dead time regulators DTR1 and DTR2 is shown in FIG. 7. The dead time regulators adjust dead time in such a way that an own unit current amplitude value of each unit calculated by an amplitude calculator AC1, and an in-unit average current amplitude value calculated by an amplitude calculator AC2, match. The own unit current output by each unit, and the average current amplitude value, are calculated by the amplitude calculators AC1 and AC2. A deviation of the two current values is obtained by an adder AD1, and input into an regulator ACR. The output of the regulator ACR is input into an upper and lower limit limiter LMT which has 0 as a lower limit value, and a fixed value as an upper limit value. The output of the limiter LMT is then added by an adder AD2 to a dead time fixed value for preventing a short circuit of upper and lower arms of the inverters. The added value is used as a delay time of on-delay circuits DT1 and DT2 into which a gate signal and an inverted gate signal are input.

When using the unit inverter in a dispersed power source connected to a power generation source whose power constantly fluctuates, such as in solar light or wind power generation, it often happens that the converted power thereof is smaller than the device capacity. In this case, it is known that it is possible, without operating all of the units, to improve efficiency from the power generation source to the alternating current output by changing the quantity of units operated in accordance with the amount of power to be converted (refer to JP-A-61-135365, and the like). In this case, a method is adopted whereby the contactor is maintained in an on condition in order to prevent a reduction of lifespan, and only the gate signal of the inverter is put into a locked condition.

Herein, in the case of stopping the gate signal of one portion of the operating units, there is a problem in that the balance reactor and filter capacitor connected to the relevant unit form a resonant circuit, and the resonant current thereof has an adverse effect on the system. Even in a hypothetical case in which no contactor is used, and no balance reactor is provided, when the wiring from the connection point of each unit to the filter capacitor is long, the impedance thereof acts as inductance, meaning that a resonant current is generated.

SUMMARY OF THE INVENTION

Consequently, an object of the invention is to construct a unit inverter control system which, in a unit inverter formed from multiple units, improves a partial load efficiency of a device by changing the quantity of units operated in accordance with the amount of power to be converted, without having an adverse effect on a system. The partial load efficiency, being an efficiency which also takes a time of low power into consideration, can be obtained in a photovoltaic inverter using Equation 1.

$$\text{Partial load efficiency} = 0.03 * \eta_{5\%} + 0.06 * \eta_{10\%} + 0.13 * \eta_{20\%} + 0.1 * \eta_{30\%} + 0.48 * \eta_{50\%} + 0.2 * \eta_{100\%} \quad \text{Equation 1,}$$

where $\eta_{x\%}$ denotes the efficiency when the converter output reaches a rated X %.

In order to achieve the heretofore described object, according to one aspect of the invention, a unit inverter system linked with a power system includes multiple inverters that convert a direct current power source voltage into an alternating current voltage, an alternating current filter formed of an alternating current reactor and a capacitor connected to the output of each of the inverters, and a controller that selectively starts and stops one portion of unit inverters in accordance with an amount of power to be converted. The unit inverter system further includes a controller that increases dead time and reduces output current before turning off a gate signal of a semiconductor switching element of a unit inverter to be stopped.

According to a second aspect of the invention, the controller that increases the dead time and reduces the output current includes a function of receiving a stop signal, and gradually reducing the output current of a unit inverter to be stopped as far as a predetermined value.

According to a third aspect of the invention, the controller that increases the dead time and reduces the output current includes a controller that, in a circuit generating a dead time determined by the sum of the output of a current regulator that zeroes the deviation of the average value of the output current of each unit inverter and an own unit inverter output current actual value, and a dead time fixed value for preventing a short circuit between upper and lower arms of the semiconductor element of a unit inverter, changes a setting of the average value of the unit inverter output current to a predetermined value or below, based on a stop signal, at a time of a steady operation.

According to a fourth aspect of the invention, the controller that increases the dead time and reduces the output current includes a controller that, in a circuit generating a dead time determined by the sum of the output of a current regulator that zeroes the deviation of the average value of the output current of each unit inverter and an own unit inverter output current actual value, and a dead time fixed value for preventing a short circuit between upper and lower arms of the semiconductor element of a unit inverter, gradually changes a setting of the average value of the unit inverter output current to a predetermined value or below, based on a stop signal, at a time of a steady operation.

According to a fifth aspect of the invention, the controller that increases the dead time and reduces the output current includes a controller that, in a circuit generating a dead time determined by the sum of the output of a current regulator that zeroes the deviation of the average value of the output current of each unit inverter and an own unit inverter output current actual value, and a dead time fixed value for preventing a short circuit between upper and lower arms of the semiconductor element of a unit inverter, switches the output of the current regulator to an upper limit value of the output of the current regulator, based on a stop signal, at a time of a steady operation.

According to a sixth aspect of the invention, the controller that increases the dead time and reduces the output current includes a controller that, in a circuit generating a dead time determined by the sum of the output of a current regulator that zeroes the deviation of the average value of the output current of each unit inverter and an own unit inverter output current actual value, and a dead time fixed value for preventing a short circuit between upper and lower arms of the semiconductor element of a unit inverter, switches to a circuit that gradually changes the output of the current regulator to an upper limit value of the output of the current regulator, based on a stop signal, at a time of a steady operation.

According to a seventh aspect of the invention, an amplitude value is used as each of the average value of the output current of each unit inverter and the own unit inverter output current actual value.

According to the invention, when reducing the quantity of inverters in a unit inverter where the power to be converted fluctuates, the gate signal of the semiconductor element of the inverter circuit is turned off after the output current of the inverter to be stopped is reduced to a predetermined value or lower. As a result of this, it is possible to cause a minimum necessary quantity of units to operate while suppressing the adverse effect on the system of a sharp power fluctuation, a resonant current, and the like, and it is possible to improve the partial load efficiency.

DETAILED DESCRIPTION OF THE INVENTION

The essence of the invention lies in the point that, in a unit inverter system in which multiple inverter units are connected in parallel, the quantity of inverter units operated is selected in accordance with the amount of power to be converted. After the current of an inverter, which is a target when reducing the quantity of inverter units, is reduced, the gate signal of a semiconductor switching element of the inverter is turned off, thereby reducing the quantity of inverter units without having an adverse effect on the system.

First Embodiment

Figure 1:
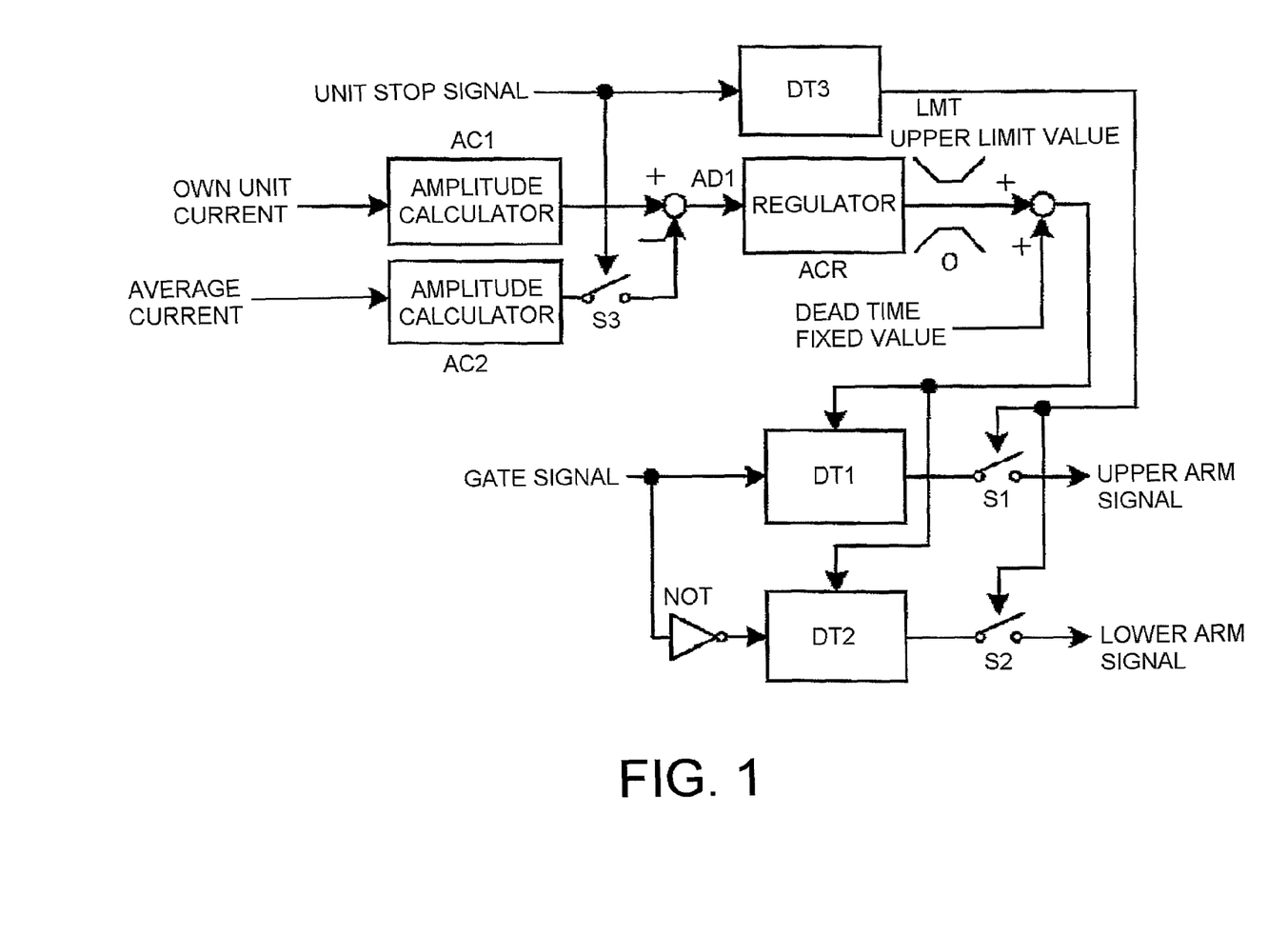
FIG. 1 is a circuit block diagram showing a first embodiment of the invention.

A first embodiment of the invention is shown in FIG. 1. The embodiment is an example in a case of using a current amplitude value as an average value of each unit inverter output current, and as an own unit current value, at a time of steady operation. A dead time regulator has a configuration which adjusts dead time in such a way that an own unit current amplitude value of each unit calculated by an amplitude calculator AC1, and an in-unit average current amplitude value calculated by an amplitude calculator AC2, match.

The own unit current output by each unit, and the average current amplitude value, are calculated by the amplitude calculators AC1 and AC2. A deviation of the two current values is obtained by an adder AD1, and input into an regulator ACR. The output of the regulator ACR is input into an upper and lower limit limiter LMT which has 0 as a lower limit value and a fixed value as an upper limit value. The output of the limiter LMT is then added by an adder AD2 to a dead time fixed value for preventing a short circuit of upper and lower arms of the inverter. The added value is used as a delay time of on-delay circuits DT1 and DT2 into which a gate signal and an inverted gate signal are input.

On a unit stop signal being input, a switch S3 connected to the output of the amplitude calculator AC2 is turned off. As a result of this, the output of the current regulator ACR attains a saturated condition, and is limited to the upper limit value of the limiter LMT. The upper limit value and the dead time fixed value for preventing a short circuit of the upper and lower arms are added by the adder AD2 and, by using the added value as the delay time of the on-delay circuits DT1 and DT2, the dead time increases, resulting in a reduction of the output current. Herein, the upper limit value of the limiter LMT is set at a value for limiting the current value to a predetermined value or lower.

Switches S1 and S2, which turn off upper and lower arm signals of the inverter switching element, are turned off after a time of an on-delay circuit DT3 from a point at which a unit stop signal is input after the output current has been reduced to the predetermined value or lower. Due to this kind of operation, the inverter switching element is turned off after the output current has been reduced when turning off the unit. Thus, it is possible to cause a minimum necessary quantity of units to operate while suppressing a sharp power fluctuation, thereby improving partial load efficiency.

Second Embodiment

Figure 2:
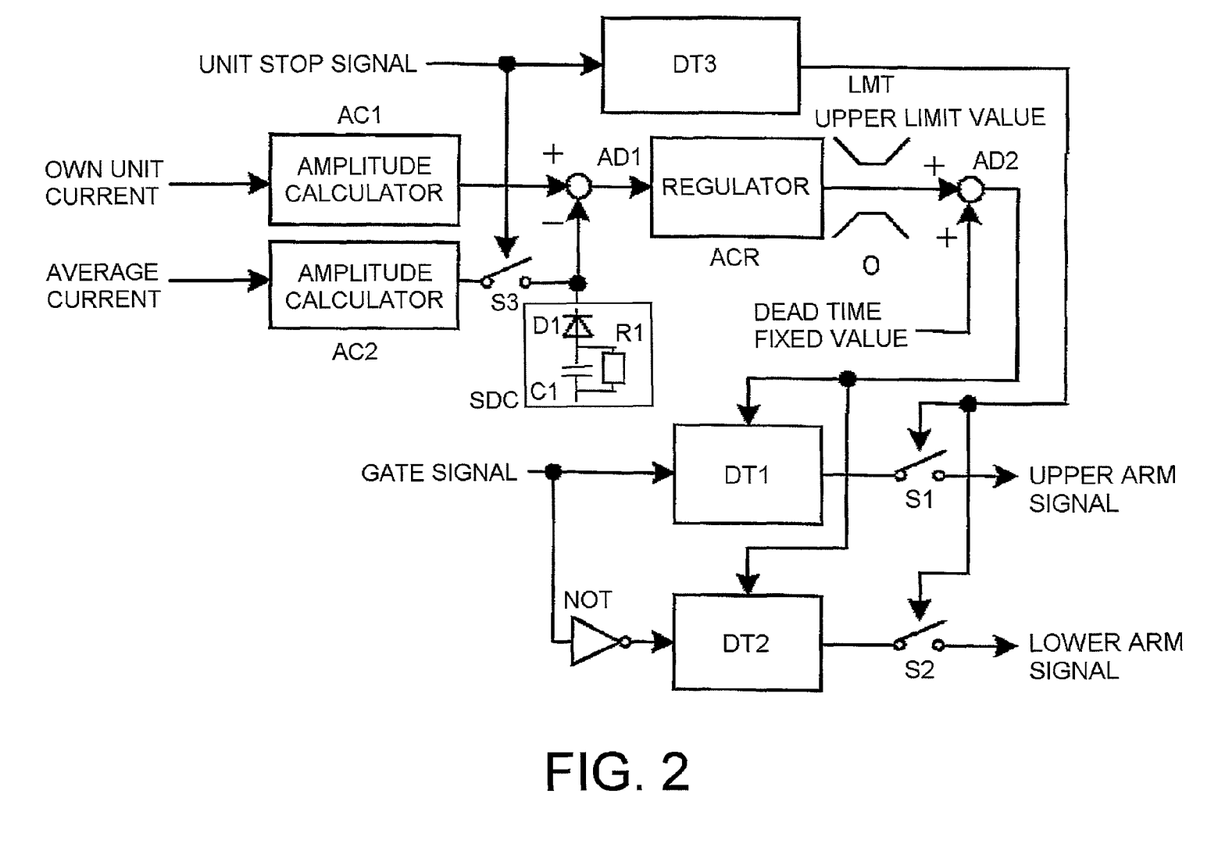
FIG. 2 is a circuit block diagram showing a second embodiment of the invention.

A second embodiment of the invention is shown in FIG. 2. A difference from the first embodiment lies in the point that a voltage soft reduction circuit SDC configured of a resistor R1, a diode D1, a capacitor C1, and the like, is connected to the output of the switch S3 that is connected to the output of the average current amplitude calculator AC2.

On the switch S3 being turned off by the input of the unit stop signal, the output of the current regulator ACR gradually rises toward the upper limit value of the limiter LMT in accordance with a voltage reduction of the voltage soft reduction circuit SDC. As a result of this, the dead time increases more slowly than in the first embodiment, it is possible to reduce the inverter output current gently, thereby reducing a rate of change of power to the system. This means that it is possible to more effectively suppress the adverse effect on the system of power fluctuation, a resonant current, and the like. It being sufficient that the voltage soft reduction circuit SDC is of a configuration which reduces the voltage gradually, it is not limited to this example.

Third Embodiment

Figure 3:
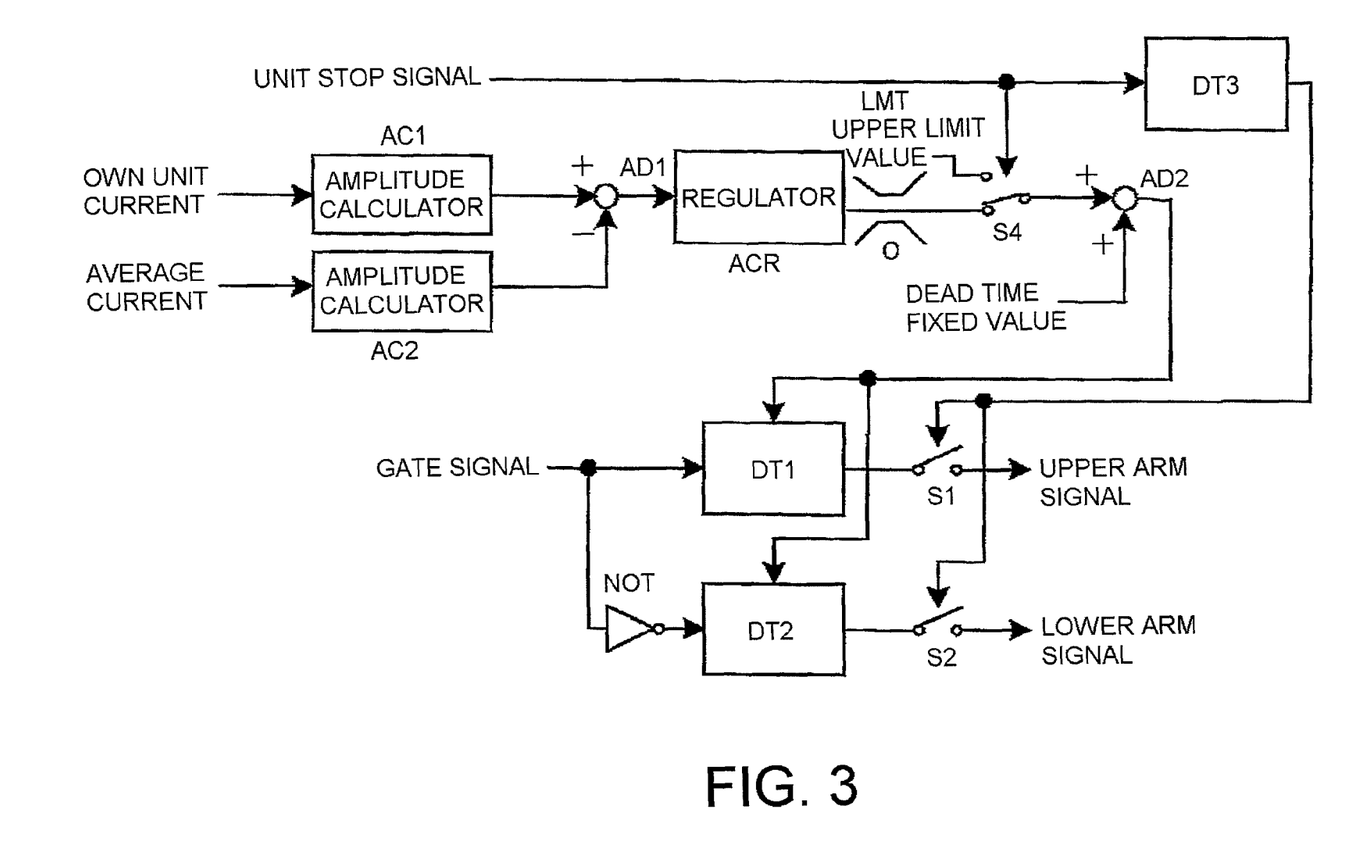
FIG. 3 is a circuit block diagram showing a third embodiment of the invention.

A third embodiment of the invention is shown in FIG. 3. A dead time regulator adjusts the dead time in such a way that the own unit current amplitude value of each unit calculated by the amplitude calculator AC1, and the in-unit average current amplitude value calculated by the calculator AC2, match.

The amplitude value of the own unit current output by each unit, and the average current amplitude value, are calculated by the amplitude calculators AC1 and AC2. A deviation of the two values is obtained by the adder AD1, and input into the regulator ACR. The output of the regulator ACR is input into the upper and lower limit limiter LMT which has 0 as the lower limit value, and a fixed value as the upper limit value. The output of the limiter LMT is then added by the adder AD2 to the dead time fixed value for preventing a short circuit of the upper and lower arms of the inverter. The added value is used as the delay time of the on-delay circuits DT1 and DT2 into which a gate signal and an inverted gate signal are input. On the unit stop signal being input, a switch S4 connected to the output of the upper and lower limit limiter LMT is switched to the upper limit value side of the limiter LMT.

As a result of this, the upper limit value and the dead time fixed value for preventing a short circuit of the upper and lower arms are added by the adder AD2 and, by using the added value as the delay time of the on-delay circuits DT1 and DT2, the dead time increases, resulting in a reduction of the output current. Herein, the upper limit value of the limiter LMT is set at a value for limiting the current value to a predetermined value or lower. The switches S1 and S2, which turn off the upper and lower arm signals of the inverter switching element, are turned off after a time of the on-delay circuit DT3 from a point at which a unit stop signal is input after the output current has been reduced to the predetermined value or lower.

Due to this kind of operation, the inverter semiconductor switching element is turned off after the output current has been reduced when turning off the unit. Therefore, it is possible to cause a minimum necessary quantity of units to operate while suppressing a sharp power fluctuation, thereby improving the partial load efficiency.

Fourth Embodiment

Figure 4:
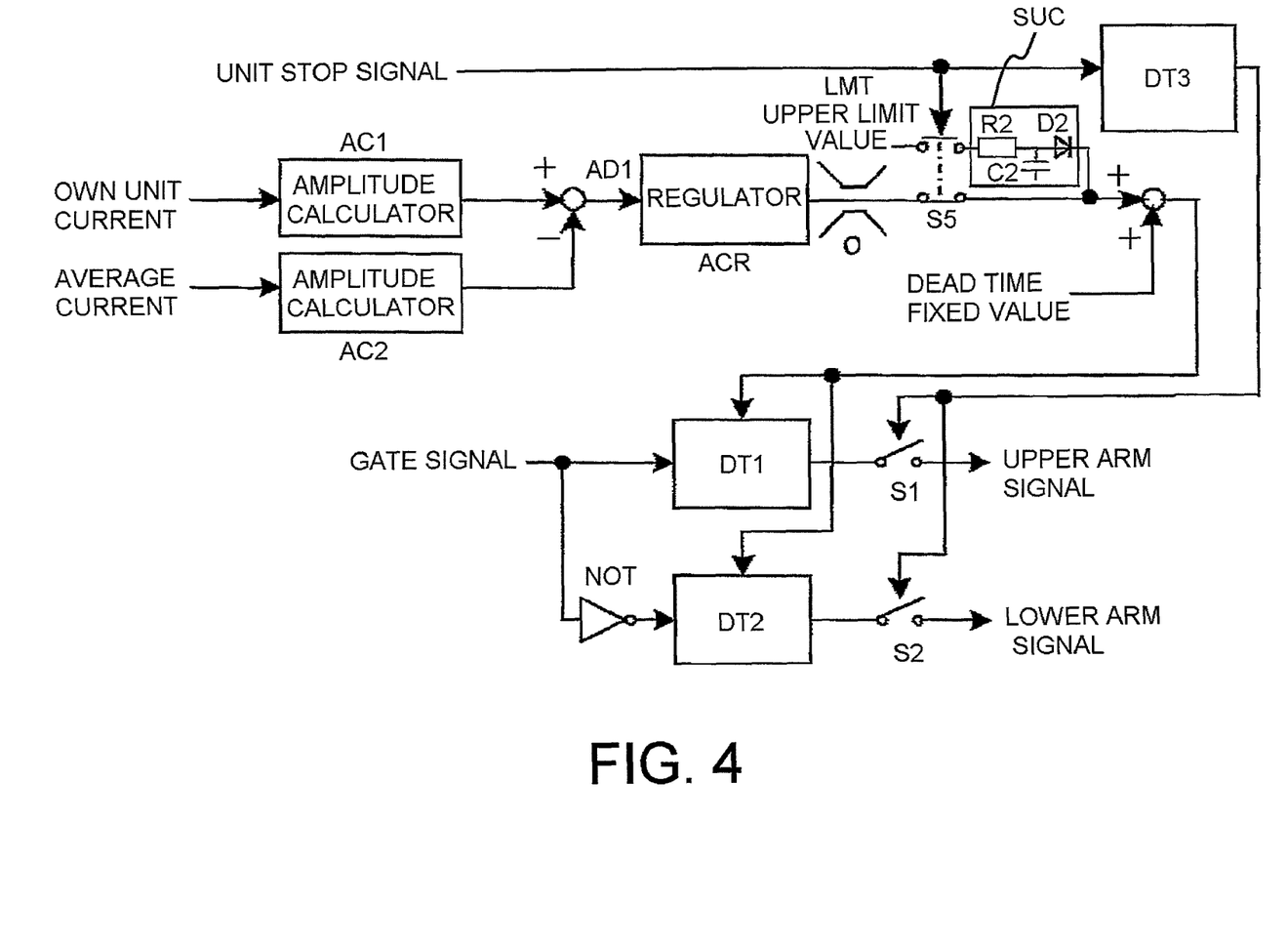
FIG. 4 is a circuit block diagram showing a fourth embodiment of the invention.

A fourth embodiment of the invention is shown in FIG. 4. A difference from the third embodiment lies in the point that the switch S4 connected to the output of the upper and lower limit limiter LMT in the third embodiment is replaced with a switch S5 including a normally open contact (NO contact) and a normally closed contact (NC contact), and the upper limit value voltage of the limiter LMT is connected to the adder AD2 via the normally open contact (NO contact) and a voltage soft increase circuit SUC configured of a resistor R2, a diode D2, a capacitor C2, and the like.

On the switch S5 being turned on by an input of the unit stop signal, the output of the current regulator is opened, and the input of the adder AD2 gradually rises toward the upper limit value of the limiter LMT in accordance with a voltage increase of the voltage soft increase circuit SUC. As a result of this, the dead time increases more slowly than in the third embodiment, and it is possible to reduce the inverter output current gently. As a result of this, it is possible to reduce the rate of change of power to the system, meaning that it is possible to more effectively suppress the adverse effect on the system of power fluctuation, a resonant current, and the like. It being sufficient that the voltage soft increase circuit SUC is of a configuration which increases the voltage gradually, it is not limited to this example.

Fifth Embodiment

Figure 5:
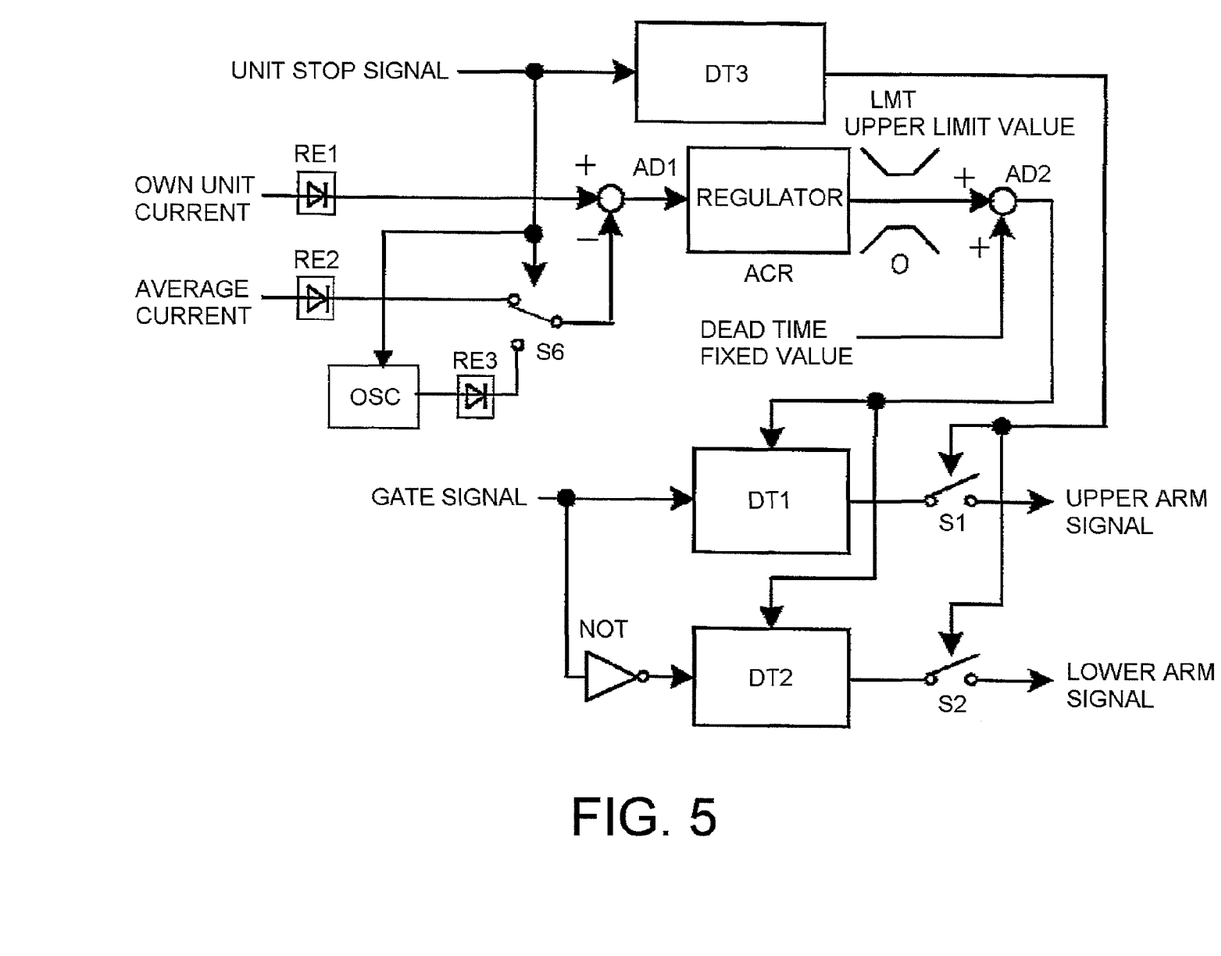
FIG. 5 is a circuit block diagram showing a fifth embodiment of the invention.

A fifth embodiment of the invention is shown in FIG. 5. A difference from the first to fourth embodiments is the difference in the amount of input into the adder AD1. In the first to fourth embodiments, the own unit current amplitude value and average current amplitude value are input at a time of steady operation, but in this embodiment, a rectified waveform where the own unit current is rectified in a regulator circuit RE1, and a rectified waveform where the average current is rectified in a regulator circuit RE2, are input. The steady operation is the same as in the first to fourth embodiments.

When the unit stop signal is input, a switch S6 is switched to the side of a voltage where the output of a sine wave oscillator OSC synchronized with a system voltage, whose amplitude is gradually reduced, is rectified in a regulator circuit RE3. As a result of this, the output of the current regulator ACR gradually attains a saturated condition, is clamped at the upper limit value of the limiter LMT, and the operation is the same as in the second embodiment.

Also, in the event that the switch S6 is opened when the unit stop signal is input in a condition in which there is no oscillator OSC or regulator circuit RE3, the operation is the same as in the first embodiment.

Furthermore, when adopting a configuration where the sine wave oscillator OSC, regulator circuit RE3, and switch S6 are removed from FIG. 5, and the output of the regulator circuit RE2 is input directly into the adder AD1, the operation is the same as in the third embodiment.

Furthermore, with the configuration where the sine wave oscillator OSC, regulator circuit RE3, and switch S6 are removed from FIG. 5, and the output of the regulator circuit RE2 is input directly into the adder AD1, when adopting a configuration where the switch S5 and voltage soft increase circuit SUC are connected to an input portion of the adder AD2, in the same way as in FIG. 4, the operation thereof is the same as in the fourth embodiment.

In the heretofore described embodiments, examples are given using contacts as switches, but they can also be realized with semiconductor switches or logical arithmetic elements. Also, examples are given of a case of using an average value of each unit inverter output current at a time of steady operation and, as an own unit current value, a current amplitude value, and a case of using rectified waveforms, but it is also possible to realize in the same way using an instantaneous value.

The invention can be applied to an uninterruptible power supply (UPS), or the like, which increases and reduces power converted by controlling the quantity of inverter units.

What is claimed is:

1. A unit inverter system connected with a power system, comprising:
   a plurality of unit inverters, each of the unit inverters including a semiconductor switching element, each unit inverter converting a direct current power source voltage into an alternating current voltage in accordance with a gate signal of the semiconductor switching element thereof, and outputting an alternating current;
   a controller configured to determine target unit inverters among the plurality of unit inverters to selectively start and stop the target unit inverters in accordance with an amount of power to be converted; and
   a plurality of regulators, each of the regulators being connected to each of the unit inverters as an own unit inverter thereof, each regulator being configured to, when the controller determines to stop the own unit inverter, determine dead time of the own unit inverter according to an output current value of the own unit inverter and an average output current value of the unit inverters, wait for the determined dead time so as to reduce the output current of the own unit inverter, and then turn off the gate signal to stop the own unit inverter.

2. The unit inverter system according to claim 1, wherein the controller is configured to, when determining to stop the target unit inverters, output a unit stop signal to the target unit inverters, and
   each regulator is configured to, on receiving a stop signal, gradually reduce an output current value of the own unit inverter to a first predetermined value and gradually reduce an average output current value of the unit inverters to a second predetermined value or below.

3. The unit inverter system according to claim 2, wherein the semiconductor switching element includes lower and upper arms, and
   each regulator includes
      a current regulator configured to, on receiving the unit stop signal, receive a current of a deviation of an output current value of the own unit inverter from an average output current value of the unit inverters at a time of steady operation, limit the deviation to a limited value between a lower limit value and an upper limit value and output a current of the limited value;
      a delay generator configured to receive the output of the current regulator as an input and generate a delay as dead time of the own unit inverter to zero the deviation, the dead time being determined by the sum of the limited value and a predetermined non-zero value that is input to the upper and lower arms of the semiconductor element to prevent the upper and lower arms from being short-circuited;
      a first on-delay circuit configured to receive the gate signal and after the dead time is elapsed, output the gate signal;
      a second on-delay circuit configured to receive an inverted signal of the gate signal and after the dead time is elapsed, output the inverted signal;
      a first switch configured to, when turned on, connect the output of the first on-delay circuit to the upper arm;
      a second switch configured to, when turned on, connect the output of the second on-delay circuit to the lower arm; and
      a third on-delay circuit configured to receive the unit stop signal and after a predetermined time is elapsed, output the unit stop signal to turn on the first and second switches.

4. The unit inverter system according to claim 3, wherein the lower limit value is set to zero and the upper limit value is set to a third predetermined value.

5. The unit inverter system according to claim 3, wherein amplitude values are used as the average output current value of the unit inverters and the output current value of the own unit inverter.

6. The unit inverter system according to claim 3, wherein each regulator further includes a third switch selectively inputting a current of an average output current value to the current regulator, wherein on receiving the unit stop signal, the third switch is turned off to input to the current regulator a current of zero current value as the average output current value.

7. The unit inverter system according to claim 6, wherein each regulator further includes a voltage reduction circuit that includes a resistor, a diode and a capacitor, the voltage reduction circuit being connected to a connection point between the third switch and the current regulator.

8. The unit inverter system according to claim 3, wherein each regulator further includes a fourth switch, wherein
   the current regulator includes a limiter having lower and upper limit sides, the limiter outputting a current of one of the lower and upper limit values from the lower and upper limit sides, respectively, the fourth switch selectively connecting one of the lower and upper sides of the limiter to the input of the delay generator, and
   on receiving the unit stop signal, the fourth switch is switched to the upper limit side of the limiter, so that the delay generator receives a current of the upper limit value as an input current.

9. The unit inverter system according to claim 3, wherein each regulator further includes:
   a voltage increase circuit connected to the input of the delay generator, the voltage increase circuit including a resistor, a diode and a capacitor, and
   a fifth switch selectively forming one of an open contact and a closed contact between the output of the current regulator and the input of the delay generator, wherein on receiving the unit stop signal, the fifth switch is switched to form the open contact, so that the output of the current regulator is opened and the input of the delay generator gradually rises toward the upper limit value in accordance with a voltage increase of the voltage increase circuit.

10. The unit inverter system according to claim 3, wherein each regulator further includes:
    a first rectifier receiving the output current of the own unit inverter and outputting a rectified waveform of the received output current; and
    a second rectifier receiving the average output current of the unit inverters, and outputting a rectified waveform of the received average output current;
    a third rectifier receiving a third current outputted from a sine wave oscillator synchronized with a system voltage, whose amplitude is gradually reduced, and outputting a rectified waveform of the third current; and
    a sixth switch configured to select one of the second and third rectifiers, and connect the output of the selected rectifier to an input of the current regulator, wherein on receiving the unit stop signal, the sixth switch is switched to select the third rectifier.

11. A regulator in a unit inverter system connected with a power system, the unit inverter system including a plurality of unit inverters and a controller, each of the unit inverters converting a direct current power source voltage into an alternating current voltage in accordance with a gate signal of a semiconductor switching element thereof, and outputting an alternating current, the controller determining target unit inverters among the plurality of unit inverters to selectively stop the target unit inverters in accordance with an amount of power to be converted by outputting a unit stop signal to the target unit inverters, the regulator being connected to a unit inverter from among the plurality of unit inverters, as an own unit inverter thereof, the regulator comprising:
- a current regulator configured to, on receiving the unit stop signal, receive a current of a deviation of an output current value of the own unit inverter from an average output current value of the unit inverters at a time of steady operation, limit the deviation to a limited value between a lower limit value and an upper limit value and output a current of the limited value;
- a delay generator configured to receive the output of the current regulator as an input and generate a delay as dead time of the own unit inverter to zero the deviation, the dead time being determined by the sum of the limited value and a predetermined non-zero value that is input to upper and lower arms of the semiconductor element to prevent the upper and lower arms from being short-circuited;
- a first on-delay circuit configured to receive the gate signal and after the dead time is elapsed, output the gate signal;
- a second on-delay circuit configured to receive an inverted signal of the gate signal and after the dead time is elapsed, output the inverted signal;
- a first switch configured to, when turned on, connect the output of the first on-delay circuit to the upper arm;
- a second switch configured to, when turned on, connect the output of the second on-delay circuit to the lower arm; and
- a third on-delay circuit configured to receive the unit stop signal and after a predetermined time is elapsed, output the unit stop signal to turn on the first and second switches.

12. The regulator according to claim 11, wherein the lower limit value is set to zero and the upper limit value is set to a predetermined value.

13. The regulator according to claim 11, wherein amplitude values are used as the average output current value of the unit inverters and the output current value of the own unit inverter.

14. The regulator according to claim 11, further comprising a third switch selectively inputting a current of an average output current value to the current regulator, wherein on receiving the unit stop signal, the third switch is turned off to input to the current regulator a current of zero current value as the average output current value.

15. The regulator according to claim 14, further comprising a voltage reduction circuit that includes a resistor, a diode and a capacitor, the voltage reduction circuit being connected to a connection point between the third switch and the current regulator.

16. The regulator according to claim 11, further comprising a fourth switch, wherein
- the current regulator includes a limiter having lower and upper limit sides, the limiter outputting a current of one of the lower and upper limit values from the lower and upper limit sides, respectively, the fourth switch selectively connecting one of the lower and upper sides of the limiter to the input of the delay generator, and
- on receiving the unit stop signal, the fourth switch is switched to the upper limit side of the limiter, so that the delay generator receives a current of the upper limit value as an input current.

17. The regulator according to claim 11, further comprising:
- a voltage increase circuit connected to the input of the delay generator, the voltage increase circuit including a resistor, a diode and a capacitor; and
- a fifth switch selectively forming one of an open contact and a closed contact between the output of the current regulator and the input of the delay generator, wherein on receiving the unit stop signal, the fifth switch is switched to form the open contact, so that the output of the current regulator is opened and the input of the delay generator gradually rises toward the upper limit value in accordance with a voltage increase of the voltage increase circuit.

18. The regulator according to claim 11, further comprising:
- a first rectifier receiving the output current of the own unit inverter and outputting a rectified waveform of the received output current; and
- a second rectifier receiving the average output current of the unit inverters, and outputting a rectified waveform of the received average output current;
- a third rectifier receiving a third current outputted from a sine wave oscillator synchronized with a system voltage, whose amplitude is gradually reduced, and outputting a rectified waveform of the third current; and
- a sixth switch configured to select one of the second and third rectifiers, and connect the output of the selected rectifier to an input of the current regulator, wherein on receiving the unit stop signal, the sixth switch is switched to select the third rectifier.

* * * * *